(12) United States Patent
Tatsuzawa et al.

(10) Patent No.: US 9,025,065 B2
(45) Date of Patent: May 5, 2015

(54) SOLID-STATE IMAGING DEVICE, IMAGE PROCESSING METHOD, AND CAMERA MODULE FOR CREATING HIGH DYNAMIC RANGE IMAGES

(71) Applicant: Kabushiki Kaisha Toshiba, Tokyo (JP)

(72) Inventors: Yukiyasu Tatsuzawa, Kanagawa (JP); Kazuhiro Hiwada, Kanagawa (JP); Tatsuji Ashitani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 13/872,361

(22) Filed: Apr. 29, 2013

(65) Prior Publication Data
US 2014/0111675 A1   Apr. 24, 2014

(30) Foreign Application Priority Data
Oct. 24, 2012   (JP) .................................. 2012-234528

(51) Int. Cl.
H04N 5/235 (2006.01)
H04N 5/341 (2011.01)
H04N 5/353 (2011.01)
H04N 5/355 (2011.01)
H04N 5/378 (2011.01)

(52) U.S. Cl.
CPC ............. *H04N 5/341* (2013.01); *H04N 5/3532* (2013.01); *H04N 5/35554* (2013.01); *H04N 5/378* (2013.01)

(58) Field of Classification Search
CPC . H04N 5/341; H04N 5/35554; H04N 5/3532; H04N 5/378
See application file for complete search history.

(56) References Cited

U.S. PATENT DOCUMENTS

| 7,446,812 B2* | 11/2008 | Ando et al. .................... 348/362 |
| 7,554,588 B2* | 6/2009 | Yaffe ............................. 348/297 |
| 8,749,685 B2* | 6/2014 | Hatabu .......................... 348/311 |
| 2005/0045980 A1* | 3/2005 | Guidash ......................... 257/432 |
| 2008/0284872 A1 | 11/2008 | Asoma |
| 2009/0231445 A1 | 9/2009 | Kanehiro |
| 2010/0231749 A1 | 9/2010 | Tatsuzawa et al. |
| 2014/0063294 A1* | 3/2014 | Tatsuzawa et al. ............. 348/239 |

FOREIGN PATENT DOCUMENTS

| JP | 2003-244710 | 8/2003 |
| JP | 4306750 | 5/2009 |
| JP | 2009-225072 | 10/2009 |
| JP | 2010-219624 | 9/2010 |

* cited by examiner

*Primary Examiner* — Gary C Vieaux
(74) *Attorney, Agent, or Firm* — Oblon, McClelland, Maier & Neustadt, L.L.P.

(57) ABSTRACT

According to one embodiment, a solid-state imaging device includes a high dynamic range (HDR) synthesizing unit. The HDR synthesizing unit synthesizes a first image signal from a first pixel and a second image signal from a second pixel. The first pixel is a pixel to which a first exposure time is applied. The second pixel is a pixel to which a second exposure time is applied. The second exposure time is shorter than the first exposure time. The first and second horizontal lines form a periodic array. The first horizontal line is a horizontal line formed by the first pixels. The second horizontal line is a horizontal line formed by the second pixels. In the periodic array, a combination of the first horizontal lines and the second horizontal lines of the number which is twice the number of first horizontal lines is formed as units.

20 Claims, 13 Drawing Sheets

FIG.7

|  | 0 | 1 | 2 | 3 | 4 |
|---|---|---|---|---|---|
| 4H······D0 |  |  |  |  |  |
| 3H······D1 |  |  |  |  |  |
| 2H······D2 |  |  |  |  |  |
| 1H······D3 |  |  |  |  |  |
| 0H······D4 |  |  |  |  |  |

SOLID-STATE IMAGING DEVICE, IMAGE PROCESSING METHOD, AND CAMERA MODULE FOR CREATING HIGH DYNAMIC RANGE IMAGES

CROSS-REFERENCE TO RELATED APPLICATIONS

This application is based upon and claims the benefit of priority from Japanese Patent Application No. 2012-234528, filed on Oct. 24, 2012; the entire contents of which are incorporated herein by reference.

FIELD

Embodiments described herein relate generally to a solid-state imaging device, an image processing method, and a camera module.

BACKGROUND

High dynamic range (HDR) synthesis is known as a photographing method of expressing a dynamic range wider than a general photographing method. An example of the HDR synthesis method includes a method of pairing two horizontal lines for which an exposure time is different and adding signal charges of pixels for which the exposure time is different for each pair of two horizontal lines.

According to this method, the resolution of an HDR synthesis image in a direction perpendicular to a horizontal line is a half of the number of pixels included in a pixel array of an image sensor. When the number of pixels in the vertical direction of the pixel array is equal to or greater than the double of a target resolution in the vertical direction of the HDR synthesis image, the target resolution can be ensured for the HDR synthesis image. When the number of pixels in the vertical direction of the pixel array is less than the double of the target resolution in the vertical direction of the HDR synthesis image, there is a problem that an image quality may deteriorate due to a decrease in the resolution of the HDR synthesized image. In some case, due to a relation of an optical size of a camera module or the like, it is difficult to set the number of pixels in the vertical direction of the pixel array to be twice the target resolution of the HDR synthesis image.

BRIEF DESCRIPTION OF THE DRAWINGS

FIG. 7 is a diagram illustrating pixels considered to be synchronized in a line memory and a horizontal delay line;

DETAILED DESCRIPTION

In general, according to one embodiment, a solid-state imaging device includes a pixel array, a control unit, and a high dynamic range synthesizing unit. The pixel array includes a plurality of pixels arrayed in horizontal direction and vertical direction. The control unit controls driving of the pixels for each horizontal line applying one of a first exposure time and a second exposure time as an exposure time of the pixels. The horizontal line is a line in which the pixels are arrayed in the horizontal direction in the pixel array. The second exposure time is shorter than the first exposure time. The high dynamic range synthesizing unit synthesizes a first image signal from a first pixel and a second image signal from a second pixel. The first pixel is the pixel to which the first exposure time is applied. The second pixel is the pixel to which the second exposure time is applied. First horizontal lines and second horizontal lines form a periodic array in the vertical direction of the pixel array. The first horizontal lines are the horizontal lines formed by the first pixels. The second horizontal lines are the horizontal lines formed by the second pixels. A unit of the periodic array is a combination of the first horizontal lines and the second horizontal lines of the number which is twice the number of first horizontal lines.

Exemplary embodiments of a solid-state imaging device, an image processing method, and a camera module will be explained below in detail with reference to the accompanying drawings. The present invention is not limited to the following embodiments.

Figure 1:
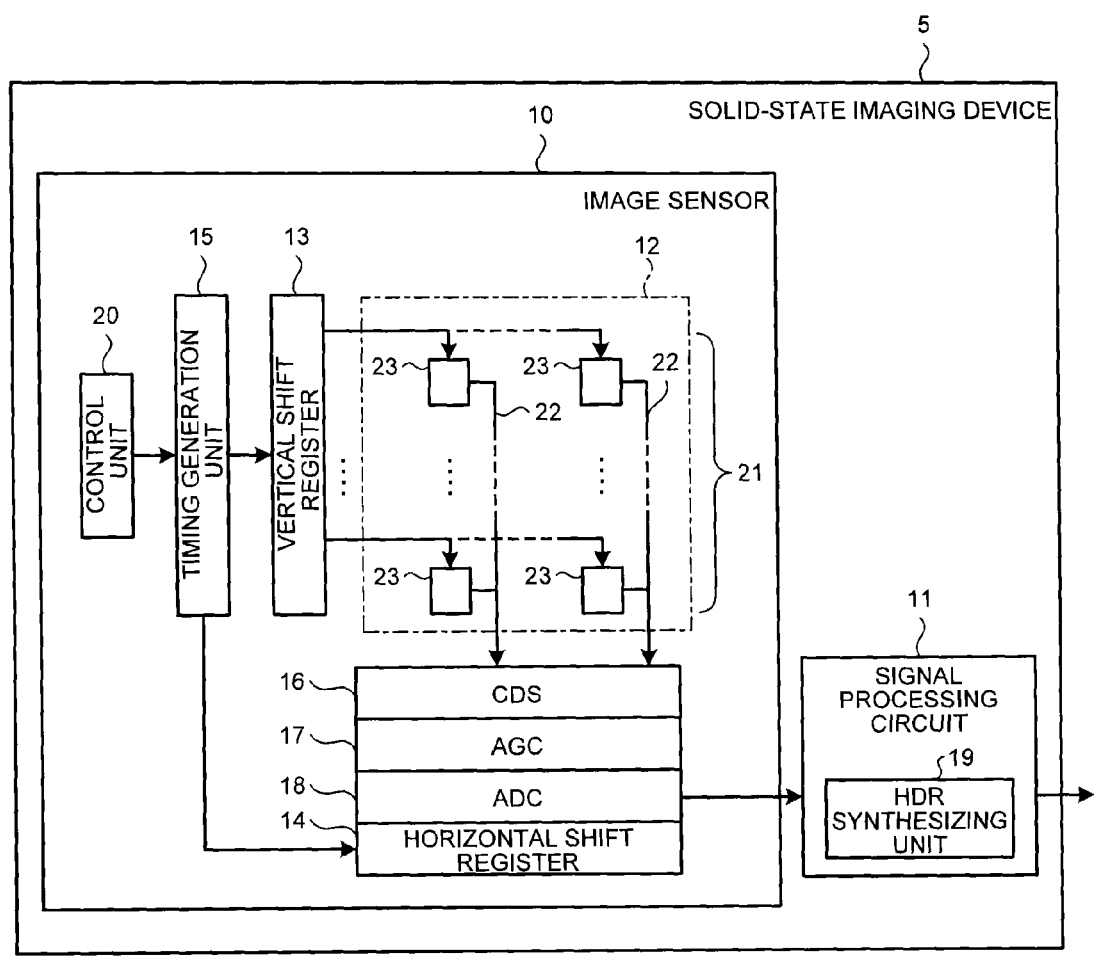
FIG. 1 is a block diagram illustrating a general configuration of a solid-state imaging device according to an embodiment.
Figure 2:
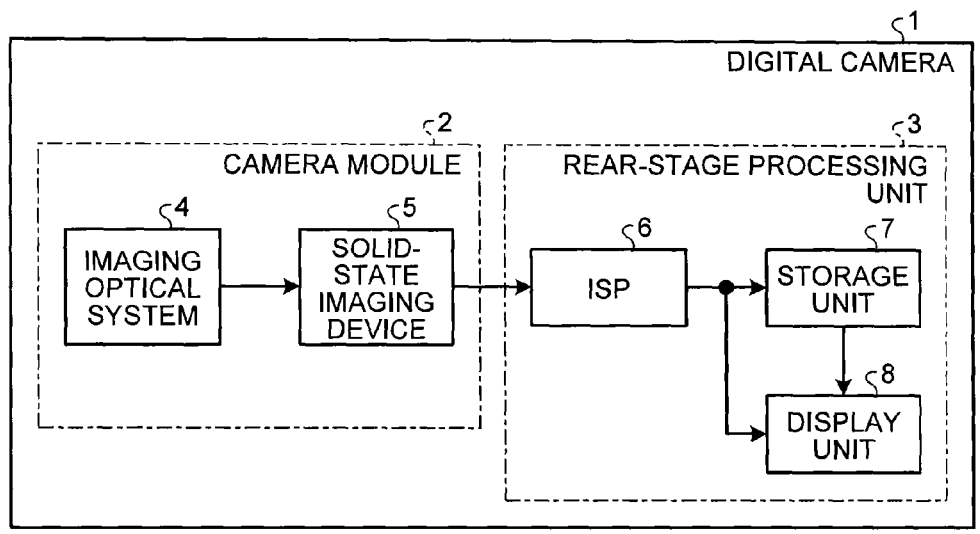
FIG. 2 is a block diagram illustrating a general configuration of a digital camera including the solid-state imaging device illustrated in FIG. 1.

FIG. 1 is a block diagram illustrating a general configuration of a solid-state imaging device according to an embodiment. FIG. 2 is a block diagram illustrating a general configuration of a digital camera including the solid-state imaging device illustrated in FIG. 1.

A digital camera 1 includes a camera module 2 and a rear-stage processing unit 3. The camera module 2 includes an imaging optical system 4 and a solid-state imaging device 5. The rear-stage processing unit 3 includes an image signal processor (ISP) 6, a storage unit 7, and a display unit 8. The camera module 2 is applied an electronic device such as a camera-attached portable terminal in addition to the digital camera 1.

The imaging optical system 4 receives light from a subject and forms a subject image. The solid-state imaging device 5 converts the light received by the imaging optical system 4 into a signal charge to capture the subject image. The ISP 6 performs signal processing on an image signal obtained through the imaging by the solid-state imaging device 5. The storage unit 7 stores an image subjected to the signal processing by the ISP 6. The storage unit 7 outputs the image signal to the display unit 8 in response to a user's operation or the like. The display unit 8 displays an image according to the image signal input from the ISP 6 or the storage unit 7. The display unit 8 is, for example, a liquid crystal display.

The solid-state imaging device 5 includes an image sensor 10 and a signal processing circuit 11. The image sensor 10 is, for example, a complementary metal oxide semiconductor (CMOS) image sensor. The image sensor 10 includes a vertical shift register 13, a horizontal shift register 14, a timing generation unit 15, a correlated double sampling unit (CDS) 16, an automatic gain control unit (AGC) 17, an analog-to-digital converter (ADC) 18, a control unit 20, and a pixel array 21.

The pixel array 21 is installed in an imaging region 12 of the image sensor 10. The pixel array 21 includes a plurality of pixels 23 arrayed in horizontal direction (row direction) and vertical direction (column direction). Each pixel 23 includes a photodiode which is a photoelectric conversion element.

The timing generation unit 15 generates a timing signal in response to an instruction from the control unit 20. The timing signal is configured as a pulse signal used to instruct a timing at which a signal is read from each pixel 23 of the pixel array 21. The timing generation unit 15 supplies the timing signal to the vertical shift register 13 and the horizontal shift register 14.

The vertical shift register 13 selects the pixels 23 in the pixel array 21 for each row according to the timing signal from the timing generation unit 15. The vertical shift register 13 outputs a reading signal to the pixels 23 of the selected row.

The pixels 23 to which the reading signal is input from the vertical shift register 13 output stored signal charges appropriate to an amount of incident light. The pixel array 21 outputs the signals from the pixels 23 to the CDS 16 via the vertical signal line 22. The vertical shift register 13 functions as a row selecting circuit that selects a row of the pixel array 21 from which the signal charges are read.

The CDS 16 performs a correlated double sampling process on the signals from the pixel array 21 to reduce fixed pattern noise. The AGC 17 amplifies the signals subjected to the correlated double sampling process by the CDS 16. The ADC 18 converts the signals amplified by the AGC 17 from an analog scheme to a digital scheme. The horizontal shift register 14 sequentially reads the signals converted into the digital scheme by the ADC 18 according to the timing signal from the timing generation unit 15.

The control unit 20 controls driving of the image sensor 10. The control unit 20 includes, for example, a microprocessor. The control unit 20 outputs an instruction to control each pixel 23 to the timing generation unit 15. The exposure time of each pixel 23 is set as any one of a first exposure time and a second exposure time for each horizontal line of the pixel array 21. The control unit 20 instructs the timing generation unit 15 to generate a timing signal appropriate to the setting of the exposure time. The control unit 20 controls the driving of the pixels 23 for each horizontal line using any one of the first exposure time and the second exposure time as the exposure time of the pixels 23. The horizontal line is a line in which the pixels 23 are arranged in the horizontal direction in the pixel array 21. The first exposure time and the second exposure time will be described below.

The signal processing circuit 11 performs various kinds of signal processing on the digital image signal read by the horizontal shift register 14. The signal processing circuit 11 includes a high dynamic range (HDR) synthesizing unit 19. The HDR synthesizing unit 19 performs HDR synthesis on the digital image signal input to the signal processing circuit 11. The signal processing circuit 11 performs signal processing such as defect correction, noise reduction, shading correction, or white balance adjustment, in addition to the HDR synthesis performed by the HDR synthesizing unit 19. The solid-state imaging device 5 outputs the image signal subjected to the signal processing by the signal processing circuit 11.

Figure 3:
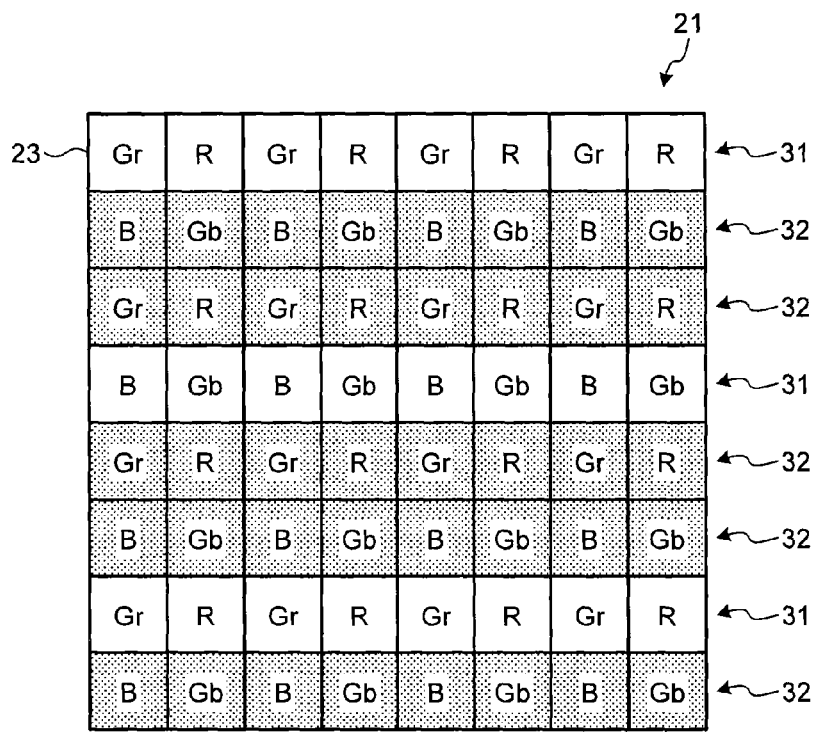
FIG. 3 is a diagram illustrating array of pixels in a pixel array and setting of an exposure time.

FIG. 3 is a diagram illustrating the array of the pixels in the pixel array and setting of an exposure time. In the pixel array 21, Gr, R, B, and Gb pixels 23 are arrayed as the Bayer array. The R pixel is the pixel 23 that detects R light. The B pixel is the pixel 23 that detects B light. The Gr and Gb pixels are the pixels 23 that detect G light. The Gr pixel is parallel to the R pixel in a horizontal line. The Gb pixel is parallel to the B pixel in a horizontal line. In the Bayer array, array of 2×2 pixels including four Gr, R, B, and Gb pixels 23 is unit array.

A long-time exposure line 31 which is a first horizontal line is assumed to be a horizontal line formed by long-time exposure pixels which are first pixels. The long-time exposure pixels are assumed to be the pixels 23 to which the first exposure time is applied. A short-time exposure line 32 which is a second horizontal line is assumed to be a horizontal line formed by short-time exposure pixels which are second pixels. The short-time exposure pixels are assumed to be the pixels 23 to which the second exposure time is applied. The second exposure time is shorter than the first exposure time.

The long-time exposure lines 31 and the short-time exposure lines 32 form periodic array in the vertical direction of the pixel array 21. A unit of the periodic array is a combination of one long-time exposure line 31 and two short-time exposure lines 32. The control unit 20 performs control such that the first exposure time is applied to the long-time exposure pixels of the long-time exposure line 31 and the second exposure time is applied to the short-time exposure pixels of the short-time exposure line 32 in correspondence with the period array.

Figure 4:
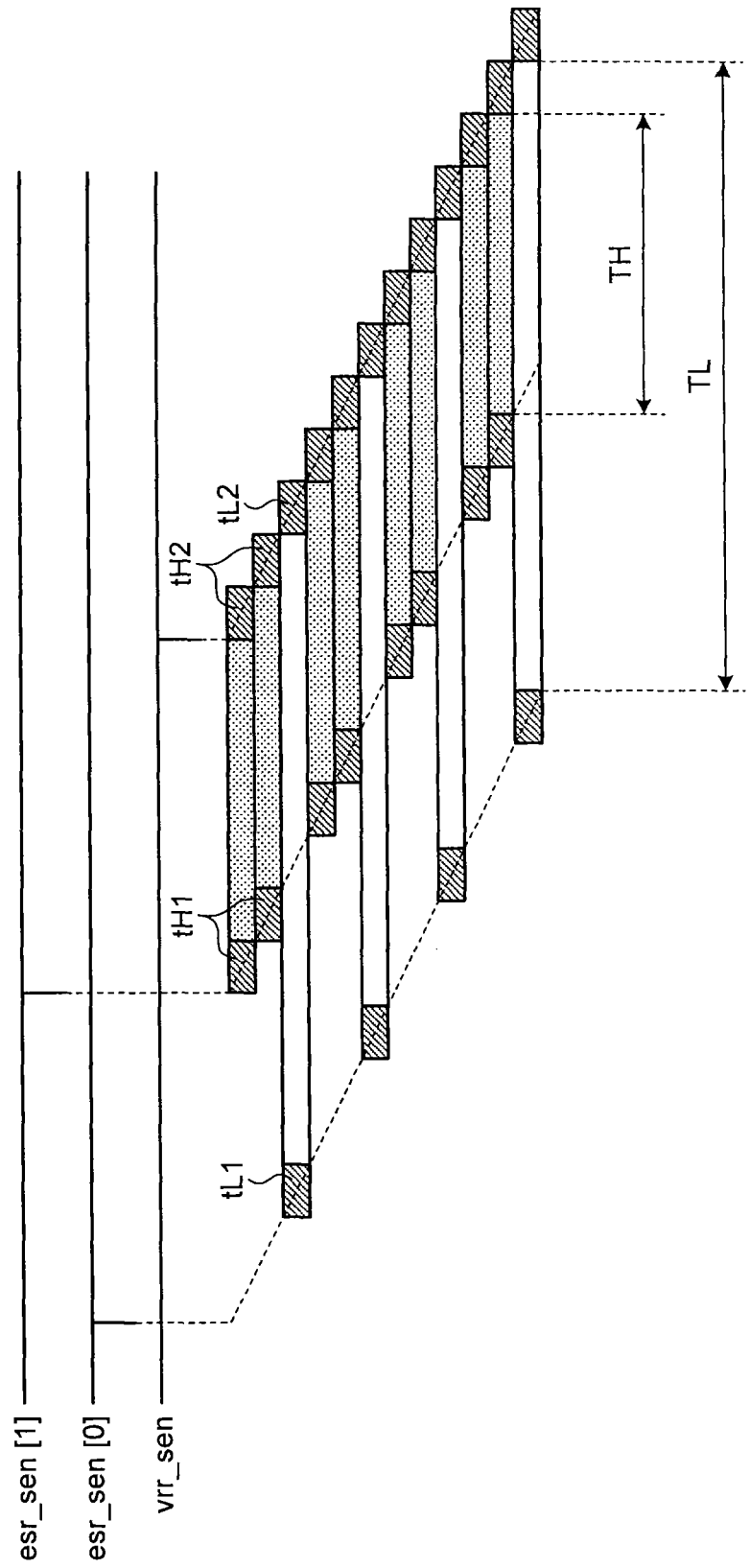
FIG. 4 is a diagram illustrating drive timings of long-time exposure pixels and short-time exposure pixels.

FIG. 4 is a diagram illustrating drive timings of the long-time exposure pixels and the short-time exposure pixels. The image sensor 10 utilizes a so-called rolling shutter system in which resetting and reading of the signal charges are scanned sequentially for each horizontal line.

Here, esr_sen[0] is a timing signal that indicates a reset timing of the long-time exposure pixel. Further, esr_sen[1] is a timing signal that indicates a reset timing of the short-time exposure pixel. Furthermore, vrr_sen is a timing signal that indicates a reading timing of the long-time exposure pixel and the short-time exposure pixel. A first exposure time TL corresponds to a time from the timing of esr_sen[0] to the timing of vrr_sen. The second exposure time TH corresponds to a time from the timing of esr_sen[1] to the timing of vrr_sen.

The long-time exposure pixels sequentially output the signal charges for each long-time exposure line 31 in response to an input of esr_sen[0]. At a reading timing tL2 starting in response to an input of vrr_sen, the long-time exposure pixel reads the signal charge stored from a reset timing tL1 starting in response to the output of the signal charge until the first exposure time TL elapses.

The short-time exposure pixels sequentially output the signal charges for each short-time exposure line 32 in response to an input of esr_sen[1]. At a reading timing tH2 starting in response to an input of vrr_sen, the short-time exposure pixel reads the signal charge stored from a reset timing tH1 starting in response to the output of the signal charge until the second exposure time TH elapses.

When the long-time exposure pixel is set as a pixel (first target pixel) to be subjected to the HDR synthesis, the HDR synthesizing unit 19 performs an interpolating process using the signal from the short-time exposure pixel located in the periphery of a first target pixel. The HDR synthesizing unit 19 adds a signal component detected by the first target pixel and a signal component obtained through the interpolating process and sets the result as an HDR synthesized signal for the first target pixel. The HDR synthesizing unit 19 performs the HDR synthesis on the long-time exposure pixels by adding the signal components originated from the short-time exposure pixels.

When the short-time exposure pixel is as a pixel (second target pixel) to be subject to the HDR synthesis, the HDR synthesizing unit 19 performs an interpolating process using the signal from the long-time exposure pixel located in the periphery of the second target pixel. The HDR synthesizing unit 19 adds a signal component detected by the second target pixel and a signal component obtained through the interpolating process and sets the result as an HDR synthesized signal for the second target pixel. The HDR synthesizing unit 19 performs the HDR synthesis on the short-time exposure pixels by adding the signal components originated from the long-time exposure pixels.

In the long-time exposure pixel, the signal charge generated through photoelectric conversion reaches a storage capacitance of the photodiode, when the amount of incident light exceeds a predetermined saturated amount of light. The HDR synthesizing unit 19 generates image data for the first target pixel in which the amount of incident light reaches the saturated amount of light by performing the interpolating process using the signal components originated from the short-time exposure pixels located in the periphery of the first target pixel.

Thus, the solid-state imaging device 5 performs the HDR synthesis on all of the pixels 23 of the pixel array 21. The solid-state imaging device 5 can obtain the HDR synthesized image with the same resolution as the number of pixels arrayed in the pixel array 21 by performing the HDR synthesis on the respective pixels 23.

Figure 5:
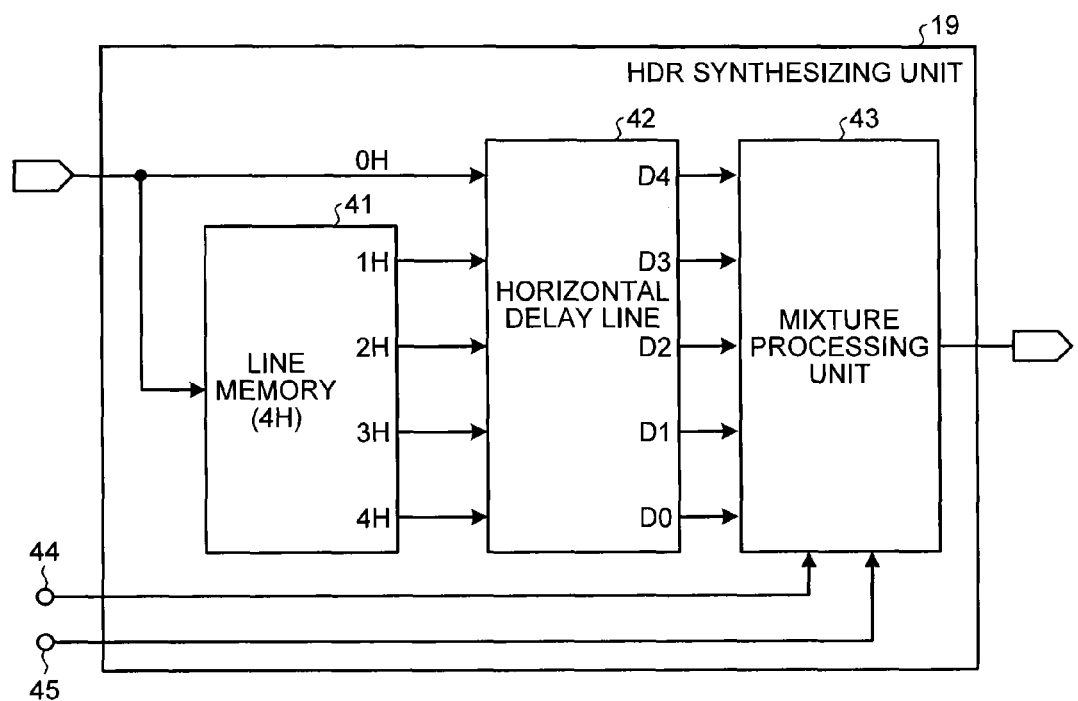
FIG. 5 is a block diagram illustrating the configuration of an HDR synthesizing unit.

FIG. 5 is a block diagram illustrating the configuration of the HDR synthesizing unit. The HDR synthesizing unit 19 synthesizes a first image signal and a second image signal. The first image signal is an image signal from the long-time exposure pixel. The second image signal is an image signal from the short-time exposure pixel. The HDR synthesizing unit 19 includes a line memory (4H) 41, horizontal delay lines 42, and a mixture processing unit 43.

The line memory 41 retains a digital image signal input to the HDR synthesizing unit 19. The line memory 41 sequentially performs delaying on four horizontal lines in an input sequence of the digital image signal to the line memory 41. The four horizontal lines (4H, 3H, 2H, and 1H) sequentially subjected to the delaying in the vertical direction by the line memory 41 and one horizontal line (0H) immediately before input to the line memory 41 are input to the horizontal delay line 42. The horizontal delay line 42 performs delaying of the horizontal direction on digital image signals of five horizontal lines.

Figure 6:
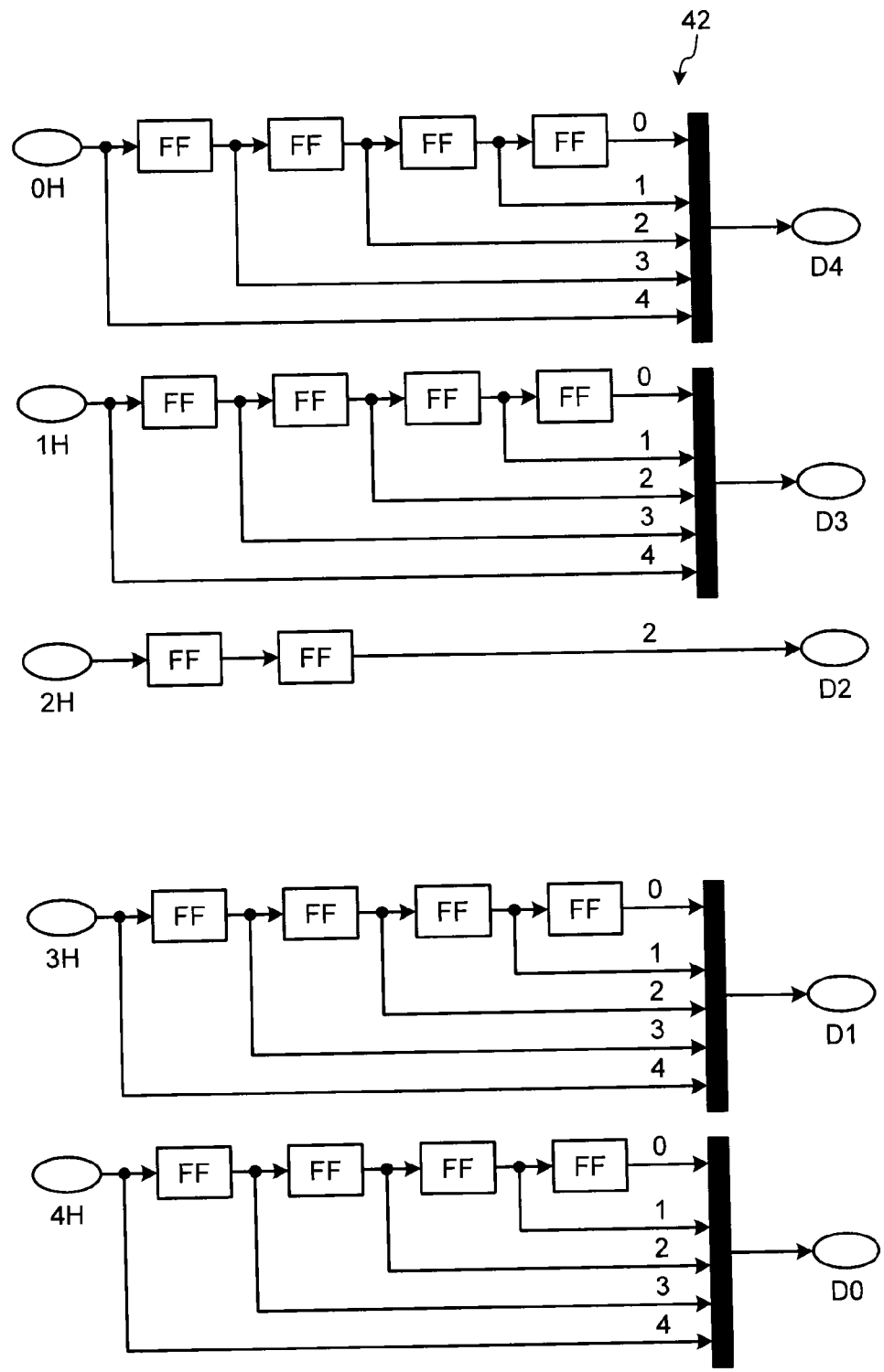
FIG. 6 is a block diagram illustrating the configuration of a horizontal delay line.

FIG. 6 is a block diagram illustrating the configuration of the horizontal delay line. The horizontal delay line 42 includes flip-flops (FF) that retain a signal for each pixel. The horizontal delay line 42 performs the delaying on four horizontal lines (0H, 1H, 3H, and 4H) except for the middle horizontal line among the five horizontal lines using four FFs. The four FFs sequentially delay the signal for each pixel in the input sequence of the signals to the horizontal delay line 42. The horizontal delay line 42 outputs the four signals of the four horizontal lines sequentially subjected to the delaying by the FFs and outputs one signal immediately before input to the first FF.

The horizontal delay line 42 performs the delaying on the middle horizontal line (2H) using two FFs. The horizontal delay line 42 outputs one signal of the one horizontal line subjected to the delaying corresponding to two pixels from the input to the horizontal delay line 42. Furthermore, D0, D1, D2, D3, and D4 indicate signals originated from the horizontal lines 4H, 3H, 2H, 1H, and 0H, respectively.

Figure 7:
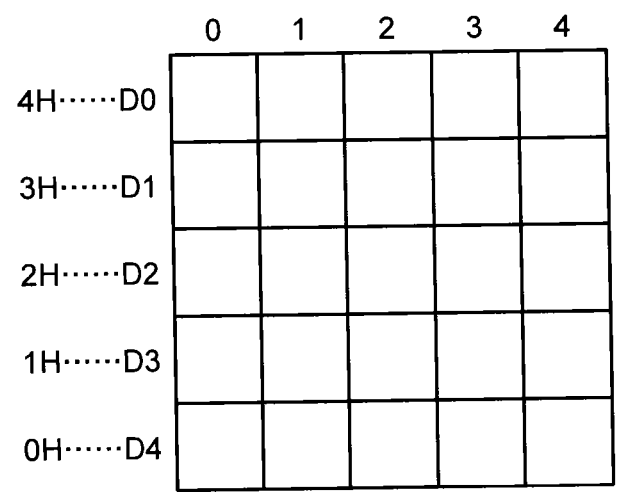

FIG. 7 is a diagram illustrating the pixels considered to be synchronized in the line memory and the horizontal delay line. The line memory 41 and the horizontal delay line 42 synchronize the signals from the pixels 23 in a 5×5 pixel block through delaying in the vertical and horizontal directions. In the drawing, among vertical components (D0 to D4) of the pixel block, components input earlier to the HDR synthesizing unit 19 are located on the upper side. Among horizontal components (0 to 4) of the pixel block, components input earlier to the HDR synthesizing unit 19 are located on the left side. The signals from the pixels 23 in the pixel block are denoted by D00 to D44 using the vertical components and the horizontal components.

The HDR synthesizing unit 19 sets the pixel located in the middle of the 5×5 pixel block as a target pixel of the HDR synthesis in the pixel block. The signals D00 to D04 (D0), D10 to D14 (D1), D22 (D2), D30 to D34 (D3), and D40 to D44 (D4) synchronized in the horizontal delay line 42 are input to the mixture processing unit 43. Among the signals, D22 is the signal from the target pixel. Further, the pixels other than the target pixel in the pixel block are appropriately referred to as periphery pixels.

The mixture processing unit 43 performs a process of mixing the signal components of the target pixel of the pixel block. Not only the signals (D0 to D4) from the pixels 23 in the pixel block but also a line pattern identification signal 44 and a color pattern identification signal 45 are input to the mixture processing unit 43. The line pattern identification signal 44 is a signal used to identify a disposition pattern of the long-time exposure lines 31 and the short-time exposure lines 32 in the pixel block. The color pattern identification signal 45 is a signal used to identify a disposition pattern of each color pixel in the pixel block.

Figure 8:
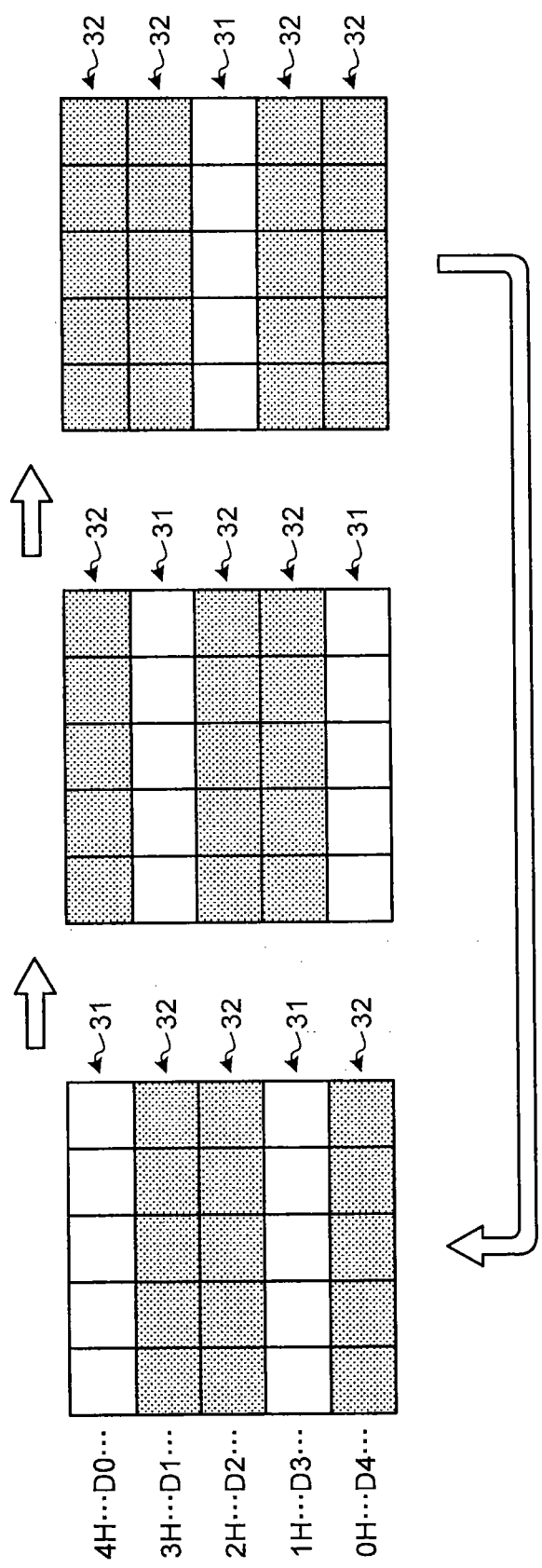
FIG. 8 is a diagram illustrating transition of a disposition pattern of long-time exposure lines and short-time exposure lines in the pixel block.

FIG. 8 is a diagram illustrating transition of the disposition pattern of the long-time exposure lines and the short-time exposure lines in the pixel block. The disposition pattern of the long-time exposure lines 31 and the short-time exposure lines 32 in the pixel block repeatedly transitions among three states illustrated in the drawing, whenever a range of the pixel block on the pixel array 21 is scanned in the vertical direction.

In a given disposition pattern, for example, horizontal lines 4H and 1H are assumed to be the long-time exposure lines 31 and the other horizontal lines 3H, 2H, and 0H are assumed to be the short-time exposure lines 32. In the pixel block, the long-time exposure lines (L) 31 and the short-time exposure lines (S) 32 are disposed in the order of "L, S, S, L, S" from the upper side. The signals D0 and D3 are first image signals from the long-time exposure pixels. The signals D1, D2, and D4 are second image signals from the short-time exposure pixels. In this disposition pattern, the control unit 20 outputs, for example, "0" as the line pattern identification signal 44.

In the subsequent disposition pattern, for example, the horizontal lines 3H and 0H are assumed to the long-time exposure lines 31 and the other horizontal lines 4H, 2H, and 1H are assumed to be the short-time exposure lines 32. In the pixel block, the long-time exposure lines (L) 31 and the short-time exposure lines (S) 32 are disposed in the order of "S, L, S, S, L" from the upper side. The signals D1 and D4 are first image signals from the long-time exposure pixels. The signals D0, D2, and D3 are second image signals from the short-time exposure pixels. In this disposition pattern, the control unit 20 outputs, for example, "1" as the line pattern identification signal 44.

In the further subsequent disposition pattern, for example, the horizontal line 2H is assumed to the long-time exposure line 31 and the other horizontal lines 4H, 3H, 1H, and 0H are assumed to be the short-time exposure lines 32. In the pixel block, the long-time exposure lines (L) 31 and the short-time exposure lines (S) 32 are disposed in the order of "S, S, L, S, S" from the upper side. The signal D2 is a first image signal from the long-time exposure pixel. The signals D0, D1, D3, and D4 are second image signals from the short-time exposure pixels. In this disposition pattern, the control unit 20 outputs, for example, "2" as the line pattern identification signal 44.

The disposition pattern of the color pixels in the pixel block repeatedly transitions among four states at which the target pixel at the center of the pixel block is one of the R, Gr, B, and Gb pixels, whenever the range of the pixel block on the pixel array 21 is scanned in the horizontal and vertical directions.

When the target pixel is one of the R and B pixels among the R, Gr, B, and Gb pixels, the control unit 20 outputs, for example, "0" as the color pattern identification signal 45. In this embodiment, the mixture processing unit 43 performs the same calculating process when the target pixel is the R and B pixels. Therefore, it is assumed that the HDR synthesizing unit 19 does not distinguish the disposition pattern in which the target pixel is the R pixel from the disposition pattern in which the target pixel is the B pixel.

When the target pixel is one of the Gr and Gb pixels, the control unit 20 outputs, for example, "1" as the color pattern identification signal 45. In this embodiment, the mixture processing unit 43 performs the same calculating process when the target pixel is the Gr and Gb pixels. Therefore, it is assumed that the HDR synthesizing unit 19 does not distinguish the disposition pattern in which the target pixel is the Gr pixel from the disposition pattern in which the target pixel is the Gb pixel.

When the three line patterns of the long-time exposure lines 31 and the short-time exposure lines 32 are multiplied by the two color patterns of the respective color pixels, there are six disposition patterns of the long-time exposure lines 31, the short-time exposure lines 32, and the respective color pixels in the pixel block. The mixture processing unit 43 identifies one of the six disposition patterns according to the line pattern identification signal 44 and the color pattern identification signal 45 and performs the mixing process appropriate to the disposition patterns of the long-time exposure lines 31 and the short-time exposure lines 32 and the respective color pixels in the pixel block.

Figure 9:
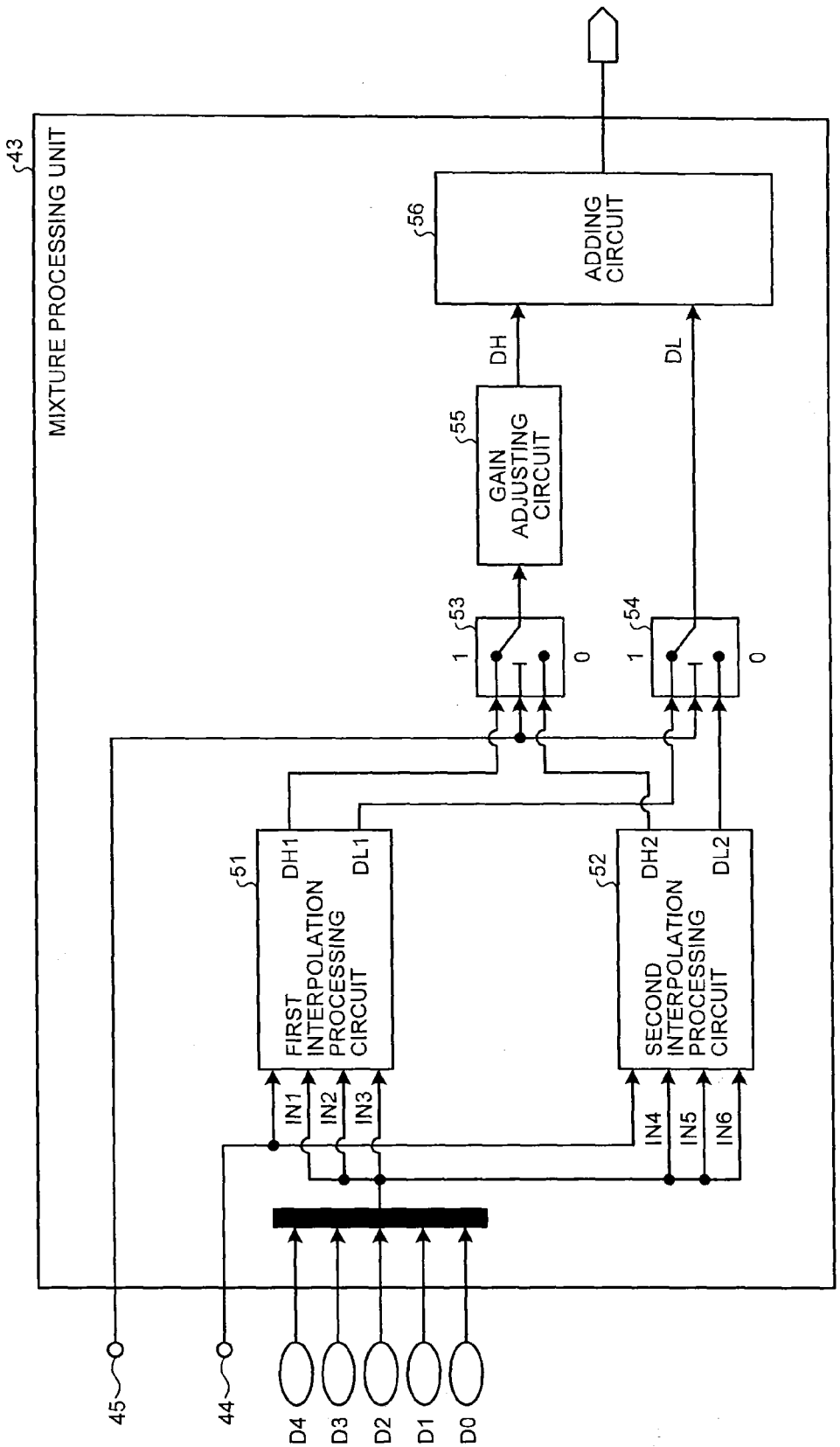
FIG. 9 is a block diagram illustrating the configuration of a mixture processing unit.

FIG. 9 is a block diagram illustrating the configuration of the mixture processing unit. The mixture processing unit 43 includes a first interpolation processing circuit 51, a second interpolation processing circuit 52, selectors 53 and 54, a gain adjusting circuit 55, and an adding circuit 56. The first interpolation processing circuit 51 and the second interpolation processing circuit 52 which are interpolation processing circuits perform an interpolating process according to the disposition of the long-time exposure line 31 and the short-time exposure line 32 in the pixel block.

The signals D0 to D4 from the horizontal delay line 42 are input to each of the first interpolation processing circuit 51 and the second interpolation processing circuit 52. The first interpolation processing circuit 51 includes three input terminals IN1, IN2, and IN3 used to input the signals D0 to D4. The second interpolation processing circuit 52 includes three input terminals IN4, IN5, and IN6 used to input the signals D0 to D4. The line pattern identification signal 44 is input to each of the first interpolation processing circuit 51 and the second interpolation processing circuit 52.

The first interpolation processing circuit 51 performs the calculating process when the Gr or Gb pixel is set as the target pixel in the pixel block. The second interpolation processing circuit 52 performs the calculating process when the R or B pixel is set as the target pixel in the pixel block. The mixture processing unit 43 selects one of the processing result obtained from the first interpolation processing circuit 51 and the processing result obtained from the second interpolation processing circuit 52 according to the color pattern identification signal 45.

The configuration in which the mixing process is performed according to the disposition pattern of the long-time exposure lines 31 and the short-time exposure lines 32 and the respective color pixels in the pixel block is not limited to the case of this embodiment. The HDR synthesizing unit 19 may be any configuration in which the mixing process can be performed according to the line pattern and the color pattern of the pixel block.

Figure 10:
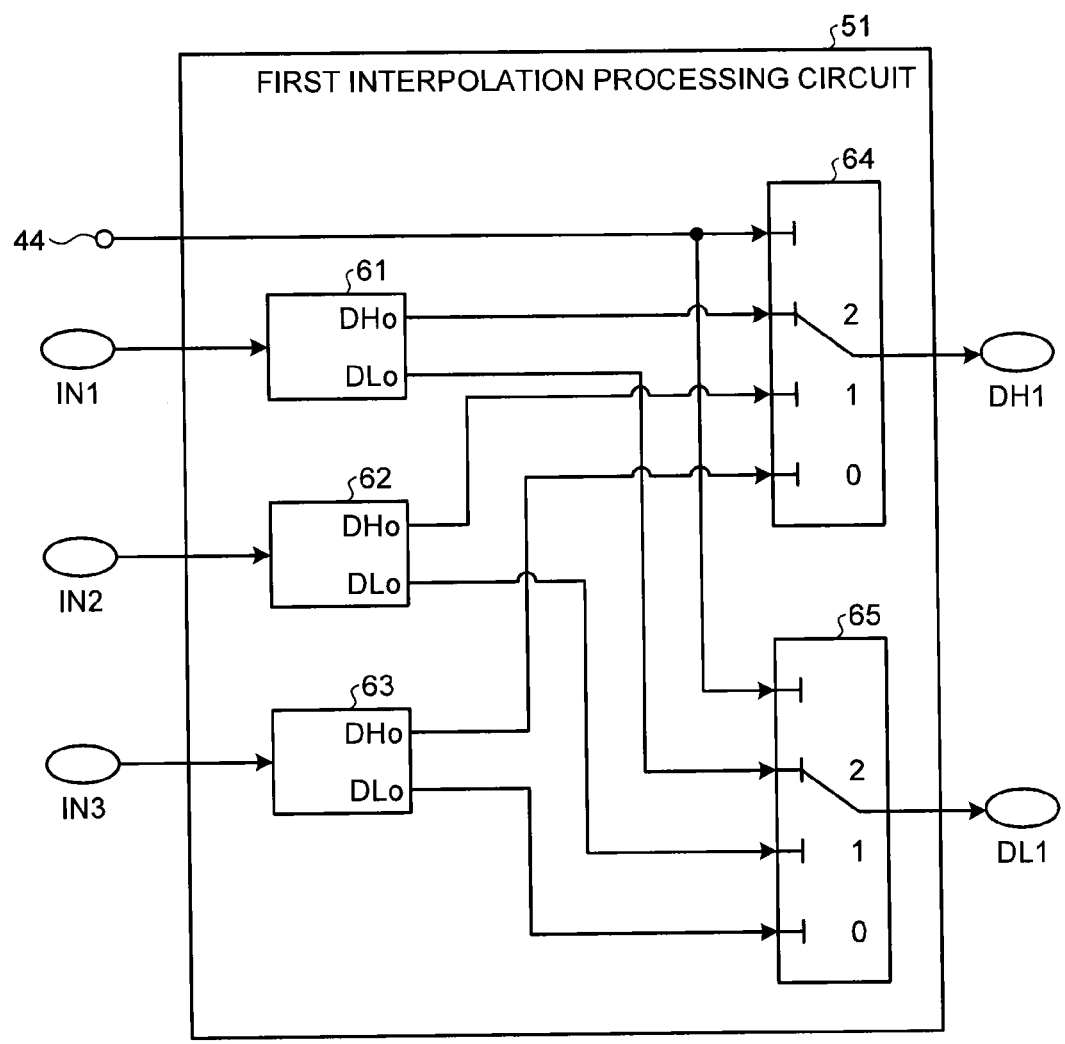
FIG. 10 is a block diagram illustrating the configuration of a first interpolation processing circuit.

FIG. 10 is a block diagram illustrating the configuration of the first interpolation processing circuit. The first interpolation processing circuit 51 includes interpolation processing calculators 61, 62, and 63 and selectors 64 and 65.

The interpolation processing calculator 61 includes an input terminal IN1 used to input the signals D0 to D4. The interpolation processing calculator 61 performs the calculating process, when the disposition of the long-time exposure line (L) 31 and the short-time exposure line (S) 32 in the pixel block is set as "S, S, L, S, S" from the upper side. The interpolation processing calculator 61 outputs the signal (D22) from the target pixel as a signal component DLo originated from the long-time exposure pixel. The interpolation processing calculator 61 calculates a signal component DHo originated from the short-time exposure pixel using a predetermined signal considered as the second image signal from the short-time exposure pixel in the setting of the signals D0, D1, D3, and D4.

The interpolation processing calculator 62 includes an input terminal IN2 used to input the signals D0 to D4. The interpolation processing calculator 62 performs the calculating process, when the disposition of the long-time exposure line (L) 31 and the short-time exposure line (S) 32 in the pixel block is set as "S, L, S, S, L" from the upper side. The interpolation processing calculator 62 outputs the signal (D22) from the target pixel as a signal component DHo originated from the short-time exposure pixel. The interpolation processing calculator 62 calculates a signal component DLo originated from the long-time exposure pixel using a predetermined signal considered as the first image signal from the long-time exposure pixel in the setting of the signals D0, D1, D3, and D4.

The interpolation processing calculator 63 includes an input terminal IN3 used to input the signals D0 to D4. The interpolation processing calculator 63 performs the calculating process, when the disposition of the long-time exposure line (L) 31 and the short-time exposure line (S) 32 in the pixel block is set as "L, S, S, L, S" from the upper side. The interpolation processing calculator 63 outputs the signal (D22) from the target pixel as a signal component DHo originated from the short-time exposure pixel. The interpolation processing calculator 63 calculates a signal component DLo originated from the long-time exposure pixel using a predetermined signal considered as the first image signal from the long-time exposure pixel in the setting of the signals D0, D1, D3, and D4.

The selector 64 selects one of the signal component DHo from the interpolation processing calculator 61, the signal component DHo from the interpolation processing calculator 62, and the signal component DHo from the interpolation processing calculator 63 using the line pattern identification signal 44 as a selection control input signal. When the line pattern identification signal 44 is "2," the selector 64 selects the signal component DHo from the interpolation processing calculator 61. When the line pattern identification signal 44 is "1," the selector 64 selects the signal component DHo from the interpolation processing calculator 62. When the line pattern identification signal 44 is "0," the selector 64 selects the signal component DHo from the interpolation processing calculator 63.

The selector 65 selects one of the signal component DLo from the interpolation processing calculator 61, the signal component DLo from the interpolation processing calculator 62, and the signal component DLo from the interpolation processing calculator 63 using the line pattern identification signal 44 as a selection control input signal. When the line pattern identification signal 44 is "2," the selector 65 selects the signal component DLo from the interpolation processing calculator 61. When the line pattern identification signal 44 is "1," the selector 65 selects the signal component DLo from the interpolation processing calculator 62. When the line pattern identification signal 44 is "0," the selector 65 selects the signal component DLo from the interpolation processing calculator 63.

The first interpolation processing circuit 51 outputs the signal selected by the selector 64 as a signal component DH1 originated from the short-time exposure pixel. The first interpolation processing circuit 51 outputs the signal selected by the selector 65 as a signal component DL1 originated from the long-time exposure pixel.

Figure 11:
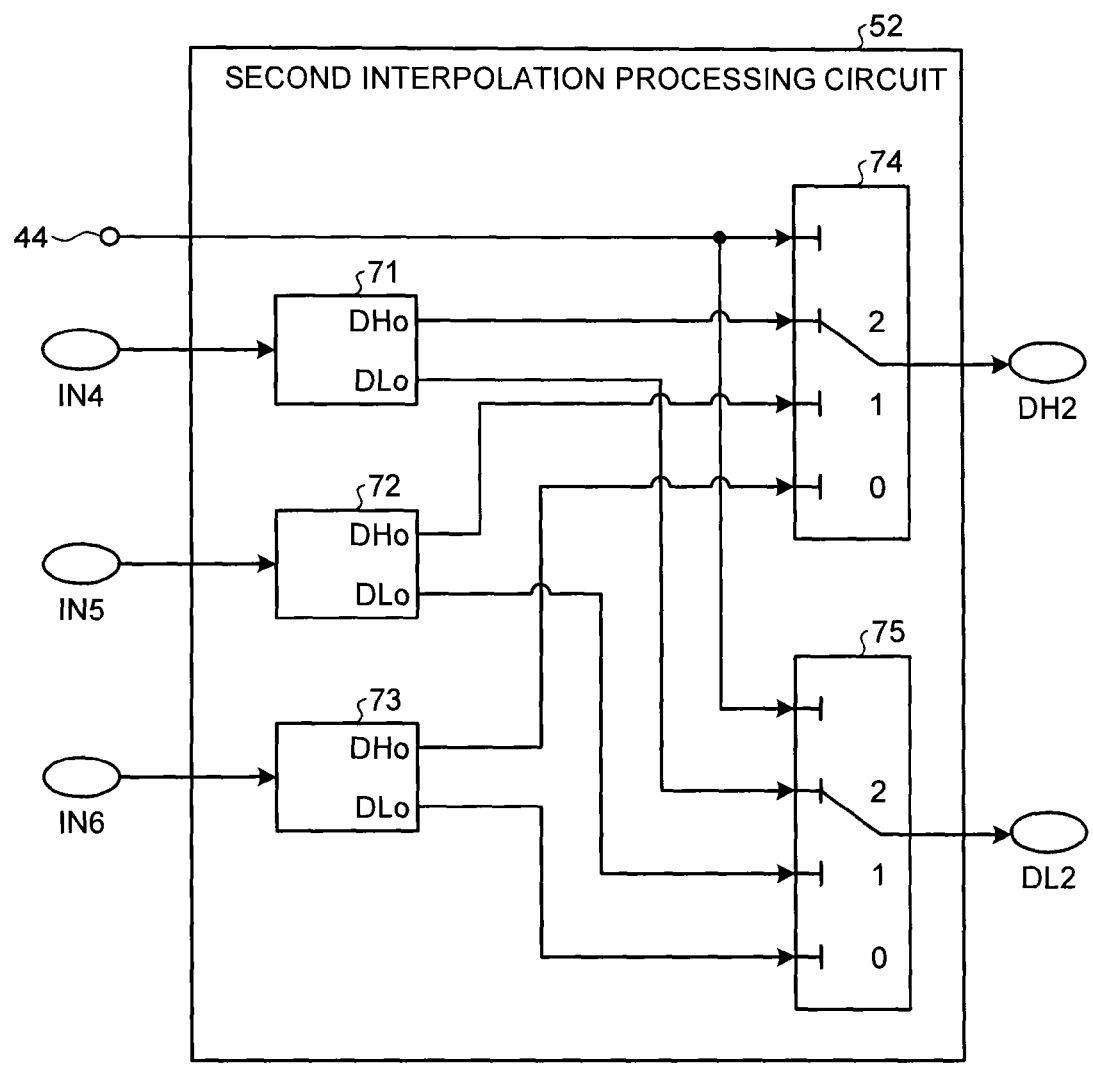
FIG. 11 is a block diagram illustrating the configuration of a second interpolation processing circuit.

FIG. 11 is a block diagram illustrating the configuration of the second interpolation processing circuit. The second interpolation processing circuit 52 includes interpolation processing calculators 71, 72, and 73 and selectors 74 and 75. The second interpolation processing circuit 52 has the same configuration as the first interpolation processing circuit 51 except for the calculation contents obtained by the interpolation processing calculators 71, 72, and 73 are different from the calculation contents obtained by the interpolation processing calculators 61, 62, and 63.

The interpolation processing calculator 71 includes an input terminal IN4 used to input the signals D0 to D4. The interpolation processing calculator 71 performs the calculating process, when the disposition of the long-time exposure line (L) 31 and the short-time exposure line (S) 32 in the pixel block is set as "S, S, L, S, S" from the upper side. The interpolation processing calculator 71 outputs the signal (D22) from the target pixel as a signal component DLo originated from the long-time exposure pixel. The interpolation processing calculator 71 calculates a signal component DHo originated from the short-time exposure pixel using a predetermined signal considered as the second image signal from the short-time exposure pixel in the setting of the signals D0, D1, D3, and D4.

The interpolation processing calculator 72 includes an input terminal IN5 used to input the signals D0 to D4. The interpolation processing calculator 72 performs the calculating process, when the disposition of the long-time exposure line (L) 31 and the short-time exposure line (S) 32 in the pixel block is set as "S, L, S, S, L" from the upper side. The interpolation processing calculator 72 outputs the signal (D22) from the target pixel as a signal component DHo originated from the short-time exposure pixel. The interpolation processing calculator 72 calculates a signal component DLo originated from the long-time exposure pixel using a predetermined signal considered as the first image signal from the long-time exposure pixel in the setting of the signals D0, D1, D3, and D4.

The interpolation processing calculator 73 includes an input terminal IN6 used to input the signals D0 to D4. The interpolation processing calculator 73 performs the calculating process, when the disposition of the long-time exposure line (L) 31 and the short-time exposure line (S) 32 in the pixel block is set as "L, S, S, L, S" from the upper side. The interpolation processing calculator 73 outputs the signal (D22) from the target pixel as a signal component DHo originated from the short-time exposure pixel. The interpolation processing calculator 72 calculates a signal component DLo originated from the long-time exposure pixel using a predetermined signal considered as the first image signal from the long-time exposure pixel in the setting of the signals D0, D1, D3, and D4.

The selector 74 selects one of the signal component DHo from the interpolation processing calculator 71, the signal component DHo from the interpolation processing calculator 72, and the signal component DHo from the interpolation processing calculator 73 using the line pattern identification signal 44 as a selection control input signal. When the line pattern identification signal 44 is "2," the selector 74 selects the signal component DHo from the interpolation processing calculator 71. When the line pattern identification signal 44 is "1," the selector 74 selects the signal component DHo from the interpolation processing calculator 72. When the line pattern identification signal 44 is "0," the selector 74 selects the signal component DHo from the interpolation processing calculator 73.

The selector 75 selects one of the signal component DLo from the interpolation processing calculator 71, the signal component DLo from the interpolation processing calculator 72, and the signal component DLo from the interpolation processing calculator 73 using the line pattern identification signal 44 as a selection control input signal. When the line pattern identification signal 44 is "2," the selector 75 selects the signal component DLo from the interpolation processing calculator 71. When the line pattern identification signal 44 is "1," the selector 75 selects the signal component DLo from the interpolation processing calculator 72. When the line pattern identification signal 44 is "0," the selector 75 selects the signal component DLo from the interpolation processing calculator 73.

The second interpolation processing circuit 52 outputs the signal selected by the selector 74 as a signal component DH2 originated from the short-time exposure pixel. The second interpolation processing circuit 52 outputs the signal selected by the selector 75 as a signal component DL2 originated from the long-time exposure pixel.

Thus, the first interpolation processing circuit 51 and the second interpolation processing circuit 52 perform the interpolating process on the target pixel (the first target pixel) which is the long-time exposure pixel using the second image signals from the short-time exposure pixels in the pixel block according to the disposition of the long-time exposure lines 31 and the short-time exposure lines 32 in the pixel block in which the first target pixel is centered.

Further, the first interpolation processing circuit 51 and the second interpolation processing circuit 52 perform the interpolating process on the target pixel (the second target pixel) which is the short-time exposure pixel using the first image signals from the long-time exposure pixels in the pixel block according to the disposition of the long-time exposure lines 31 and the short-time exposure lines 32 in the pixel block in which the second target pixel is centered.

The selector 53 illustrated in FIG. 9 selects one of the signal DH1 from the first interpolation processing circuit 51 and the signal DH2 from the second interpolation processing circuit 52 using the color pattern identification signal 45 as the selection control input signal. When the color pattern identification signal 45 is "1," the selector 53 selects the signal DH1 from the first interpolation processing circuit 51. When the color pattern identification signal 45 is "0," the selector 53 selects the signal DH2 from the second interpolation processing circuit 52. The selector 53 outputs the selected signal of the signals DH1 and DH2 as the signal component DH originated in the short-time exposure pixel.

The selector 54 selects one of the signal DL1 from the first interpolation processing circuit 51 and the signal DL2 from the second interpolation processing circuit 52 using the color pattern identification signal 45 as the selection control input signal. When the color pattern identification signal 45 is "1," the selector 54 selects the signal DL1 from the first interpolation processing circuit 51. When the color pattern identification signal 45 is "0," the selector 54 selects the signal DL2 from the second interpolation processing circuit 52. The selector 54 outputs the selected signal of the signals DL1 and DL2 as the signal component DL originated in the long-time exposure pixel.

The mixture processing unit 43 performs an interpolating process according to the disposition pattern of the long-time exposure lines 31, the short-time exposure lines 32, and the respective color pixels in the pixel block, using the first interpolation processing circuit 51, the second interpolation processing circuit 52, and the selectors 53 and 54.

The gain adjusting circuit 55 multiplies the signal component DH originated in the short-time exposure pixel by a predetermined gain such that the output levels of the long-time exposure pixel and the short-time exposure pixel accord with each other. The gain corresponds to an exposure ratio which is a ratio between the first exposure time of the long-time exposure pixel and the second exposure time of the short-time exposure pixel.

The adding circuit 56 adds the signal component DH subjected to the gain adjustment by the gain adjusting circuit 55 and the signal component DL from the selector 54. The adding circuit 56 adds the signal component DL which is the first image signal from the first target pixel and the signal component DH which is the result of the interpolating process using the second image signal for the first target pixel which is the long-time exposure pixel. The adding circuit 56 adds the signal component DH which is the second image signal from the second target pixel and the signal component DL which is the result of the interpolating process using the first image signal for the second target pixel which is the short-time exposure pixel. The mixture processing unit 43 outputs the addition result of the adding circuit 56 as an HDR synthesized signal.

The HDR synthesizing unit 19 may perform other processes in addition to the process described in this embodiment. For example, the HDR synthesizing unit 19 may perform a process of extending the signal components DL and DH, a process of adjusting a ratio, a blur removing process of suppressing a motion blur on a subject image, or the like.

Figure 12:
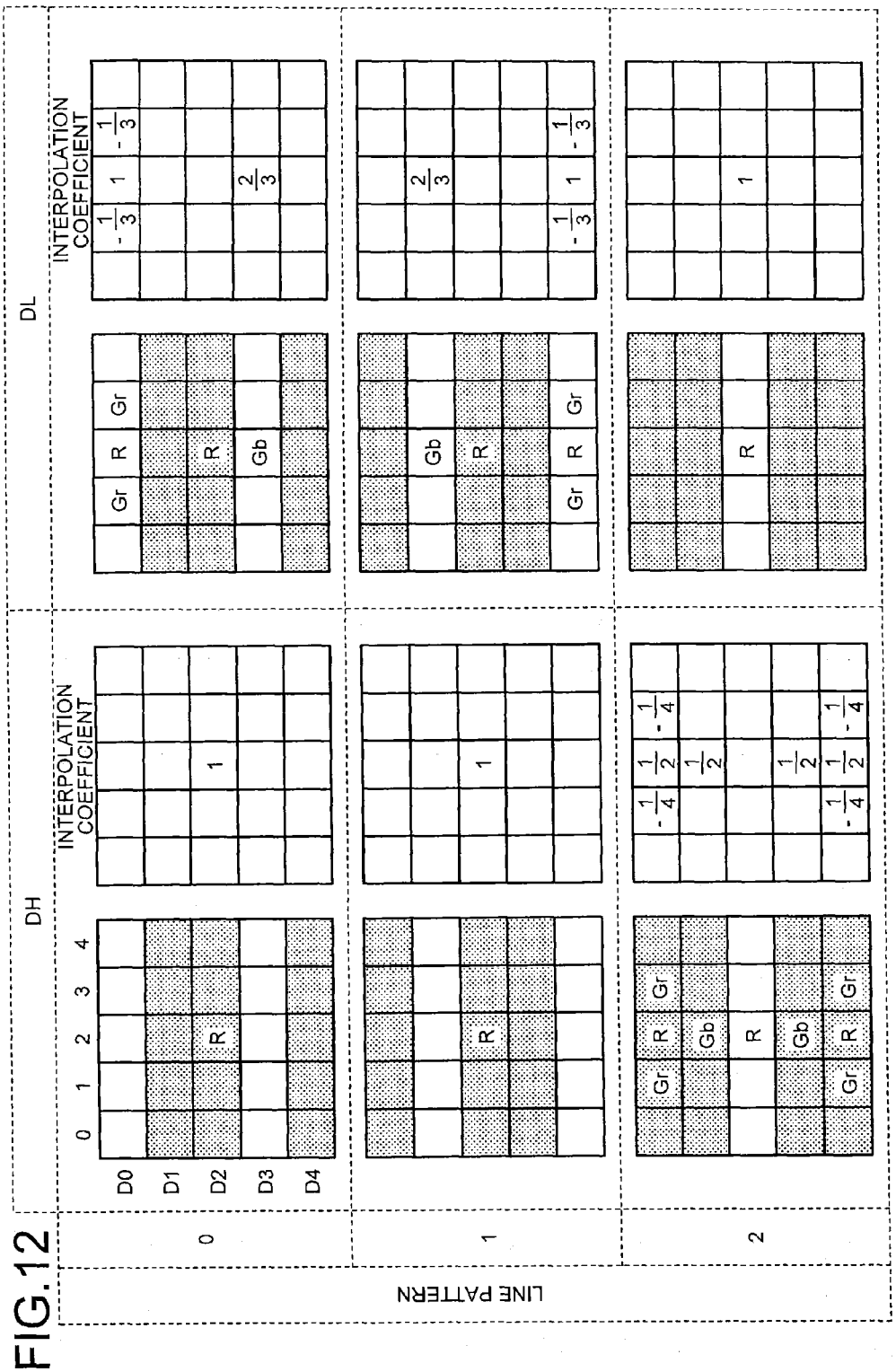
FIGS. 12 and 13 are diagrams illustrating examples of an interpolating process in the mixture processing unit.
Figure 13:
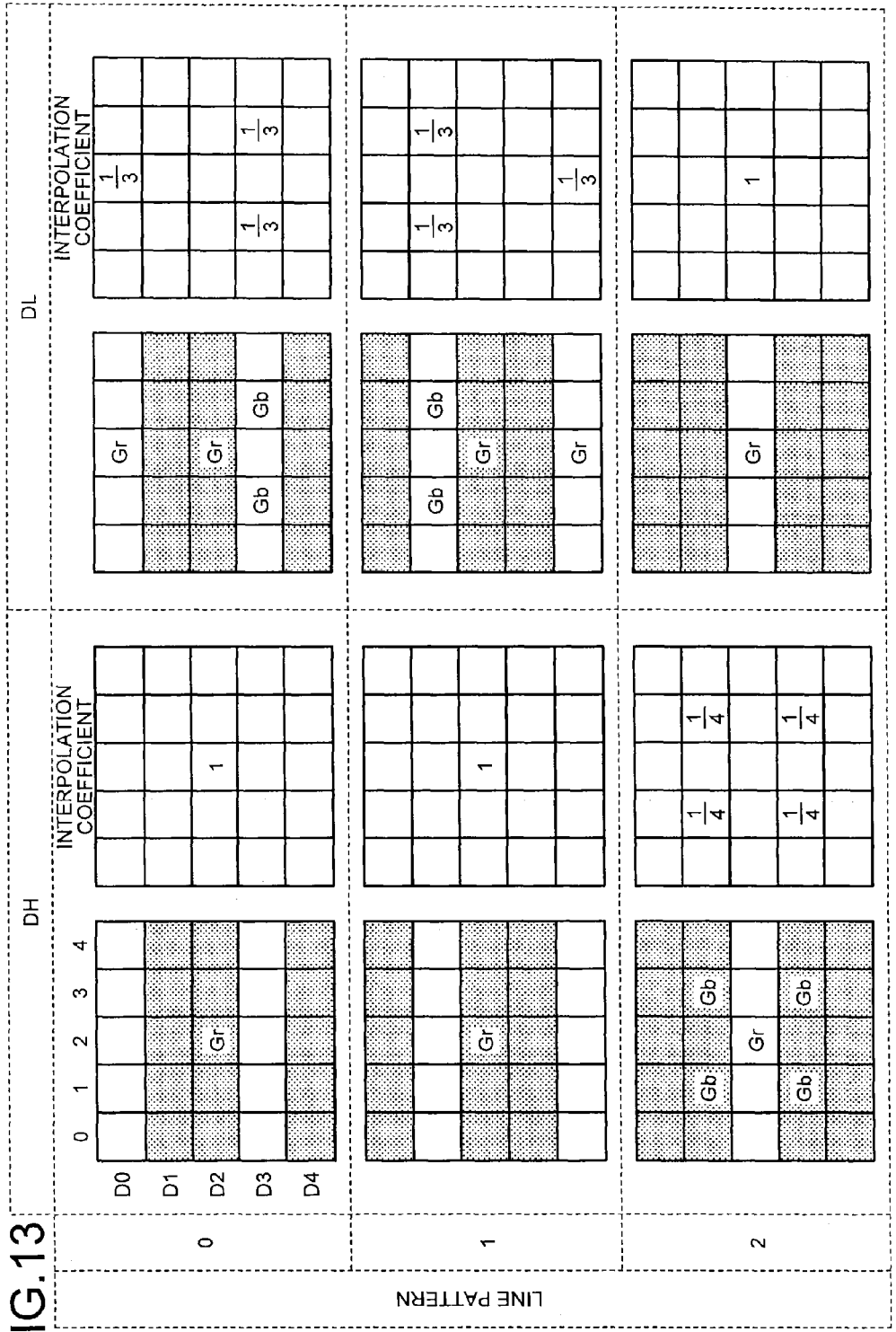

FIGS. 12 and 13 are diagrams illustrating examples of the interpolating process in the mixture processing unit. Here, a calculation example of the signal component DH originated from the short-time exposure pixel and the signal component DL originated from the long-time exposure pixel is illustrated in each disposition pattern (line pattern) of the long-time exposure lines 31 and the short-time exposure lines 32. As an interpolating process, the mixture processing unit 43 performs a process of multiplying the signal values of predetermined pixels by interpolation coefficients and adding the multiplied values. In FIGS. 12 and 13, the pixels with the signal values to be referred to and the interpolation coefficients applied to the signals are illustrated.

A line pattern "0" is used when the disposition of the long-time exposure lines (L) 31 and the short-time exposure lines (S) 32 in the pixel block is "L, S, S, L, S" from the upper side. A line pattern "1" is used when the disposition of the long-time exposure lines (L) 31 and the short-time exposure lines (S) 32 in the pixel block is "S, L, S, S, L" from the upper side. A line pattern "2" is used when the disposition of the long-time exposure lines (L) 31 and the short-time exposure lines (S) 32 in the pixel block is "S, S, L, S, S" from the upper side.

In the example illustrated in FIG. 12, the target pixel located at the center of the pixel block is assumed to be the R pixel. The calculating process exemplified in FIG. 12 is performed by the second interpolation processing circuit 52. In the mixture processing unit 43, the selectors 53 and 54 select the outputs from the second interpolation processing circuit 52, when the color pattern identification signal 45 is "0." Even when the target pixel is the B pixel, the mixture processing unit 43 performs the same calculating process as the process performed when the target pixel is the R pixel.

In the calculation of the signal component DH, the mixture processing unit 43 applies an interpolation coefficient "1" to the signal D22 of the second target pixel R which is the short-time exposure pixel, when the line pattern is "0." The mixture processing unit 43 sets the signal D22 as the signal component DH. In the calculation of the signal component DL, the mixture processing unit 43 refers to the signal values of the periphery pixels which are the long-time exposure pixels.

The mixture processing unit 43 applies the interpolation coefficient "1" to the signal D02 of the periphery pixel R. The mixture processing unit 43 applies the interpolation coefficient "$-1/3$" to the signals D01 and D03 of two periphery pixels Gr. The mixture processing unit 43 applies the interpolation coefficient "$2/3$" to the signal D32 of the periphery pixel Gb. The calculating process applied when the line pattern is "0" is performed by the interpolation processing calculator 73 (see FIG. 11).

In the calculation of the signal component DH, the mixture processing unit 43 applies an interpolation coefficient "1" to the signal D22 of the second target pixel R which is the short-time exposure pixel, when the line pattern is "1." The mixture processing unit 43 sets the signal D22 as the signal component DH. In the calculation of the signal component DL, the mixture processing unit 43 refers to the pixel values of the periphery pixels which are the long-time exposure pixels.

The mixture processing unit 43 applies the interpolation coefficient "$2/3$" to the signal D12 of the periphery pixel Gb. The mixture processing unit 43 applies the interpolation coefficient "$-1/3$" to the signals D41 and D43 of two periphery pixels Gr. The mixture processing unit 43 applies the interpolation coefficient "1" to the signal D42 of the periphery pixel R. The interpolating process applied when the line pattern is "1" is performed by the interpolation processing calculator 72 (see FIG. 11).

In the calculation of the signal component DH, the mixture processing unit 43 refers to the signal values of the periphery pixels which are the short-time exposure pixels, when the line pattern is "2."

The mixture processing unit 43 applies the interpolation coefficient "$-1/4$" to the signals D01, D03, D41, and D43 of four periphery pixels Gr. The mixture processing unit 43 applies the interpolation coefficient "$1/2$" to the signals D12 and D32 of two periphery pixels Gb. The mixture processing unit 43 applies the interpolation coefficient "½" to the signals D02 and D42 of two periphery pixels R. In the calculation of the signal component DL, the mixture processing unit 43 applies the interpolation coefficient "1" to the signal D22 of the first target pixel R which is the long-time exposure pixel. The mixture processing unit 43 sets the signal D22 to the signal component DL. The interpolating process applied when the line pattern is "2" is performed by the interpolation processing calculator 71 (see FIG. 11).

In the example illustrated in FIG. 13, the central pixel is assumed to be the Gr pixel. The calculating process exemplified in FIG. 13 is performed by the first interpolation processing circuit 51. In the mixture processing unit 43, the selectors 53 and 54 select the outputs from the first interpolation processing circuit 51, when the color pattern identification signal 45 is "1." Even when the target pixel is the Gb pixel, the mixture processing unit 43 performs the same calculating process as the process performed when the target pixel is the Gr pixel.

In the calculation of the signal component DH, the mixture processing unit 43 applies an interpolation coefficient "1" to the signal D22 of the second target pixel Gr which is the short-time exposure pixel, when the line pattern is "0." The mixture processing unit 43 sets the signal D22 as the signal component DH. In the calculation of the signal component DL, the mixture processing unit 43 refers to the signal values of the periphery pixels which are the long-time exposure pixels.

The mixture processing unit 43 applies the interpolation coefficient "⅓" to the signal D02 of the periphery pixel Gr. The mixture processing unit 43 applies the interpolation coefficient "⅓" to the signals D31 and D33 of two periphery pixels Gb. The calculating process applied when the line pattern is "0" is performed by the interpolation processing calculator 63 (see FIG. 10).

In the calculation of the signal component DH, the mixture processing unit 43 applies an interpolation coefficient "1" to the signal D22 of the second target pixel Gr which is the short-time exposure pixel, when the line pattern is "1." The mixture processing unit 43 sets the signal D22 as the signal component DH. In the calculation of the signal component DL, the mixture processing unit 43 refers to the signal values of the periphery pixels which are the long-time exposure pixels.

The mixture processing unit 43 applies the interpolation coefficient "⅓" to the signal D42 of the periphery pixel Gr. The mixture processing unit 43 applies the interpolation coefficient "⅓" to the signals D11 and D13 of two periphery pixels Gb. The calculating process applied when the line pattern is "1" is performed by the interpolation processing calculator 62 (see FIG. 10).

In the calculation of the signal component DH, the mixture processing unit 43 refers to the signal values of the periphery pixels which are the short-time exposure pixels, when the line pattern is "2." The mixture processing unit 43 applies the interpolation coefficients "¼" to each of the signals D11, D13, D31, and D33 of four periphery pixels Gb. In the calculation of the signal component DL, the mixture processing unit 43 applies the interpolation coefficient "1" to the signal D22 of the first target pixel Gr which is the long-time exposure pixel. The mixture processing unit 43 sets the signal D22 as the signal component DL. The interpolating process applied when the line pattern is "2" is performed by the interpolation processing calculator 61 (see FIG. 10).

The interpolating process in the mixture processing unit 43 is not limited to the interpolating processes described in this embodiment, but may be appropriately modified. The mixture processing unit 43 may appropriately change the pixel with the signal value to be referred to and the interpolation coefficient to be applied to each signal in order to perform the interpolating process in the pixel block. The pixel block is not limited to the case of the 5×5 pixel block. The number of pixels included in the pixel block may be appropriately changed. In the HDR synthesizing unit 19, the configuration for synchronizing the signals from the pixels 23, the configuration for performing the interpolating process, or the like may be appropriately modified according to the pattern of the pixel block.

Figure 14:
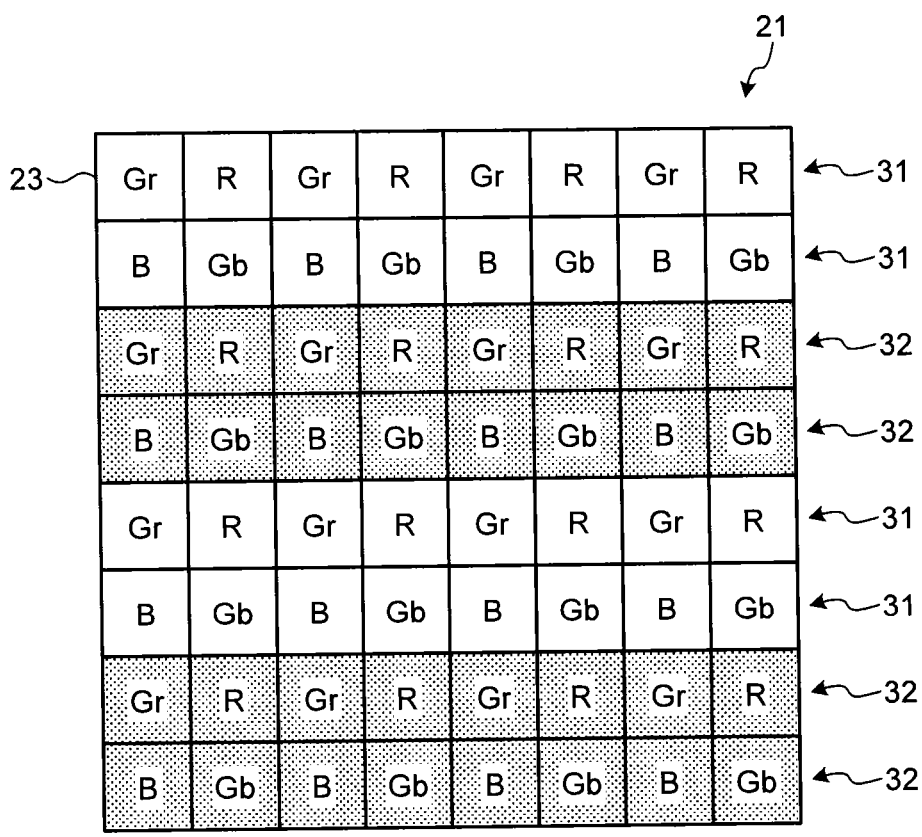
FIG. 14 is a diagram illustrating setting of an exposure time according to a comparative example of the embodiment.

FIG. 14 is a diagram illustrating the setting of the exposure time according to a comparative example of this embodiment. Even in the comparative example, the Gr, R, B, and Gb pixels 23 of the pixel array 21 are arrayed as the Bayer array, as in the embodiment. In the comparative example, the long-time exposure lines 31 and the short-time exposure lines 32 form periodic array in the vertical direction in units of a combination of two long-time exposure lines 31 and two short-time exposure lines 32.

In the comparative example, two periods of the disposition pattern of the color pixels accord with one period of the line pattern in the vertical direction. In the case of the comparative example, the interpolating process on a target pixel to be subjected to the HDR synthesis using the target pixel and periphery pixels of the same color can be performed. In the periodic array in which two long-time exposure lines 31 are adjacent to each other, the amount of incident light in the long-time exposure pixels is generally saturated across two long-time exposure lines 31. Therefore, when the amount of incident light is saturated, image data is lost every two long-time exposure lines 31.

A defect of image data has a relatively larger influence on the image quality in the long-time exposure pixel than in the short-time exposure pixel. When the amount of incident light is saturated, the image data of the long-time exposure pixel is lost every two horizontal lines, and thus the sense of resolution of an HDR synthesized image may easily deteriorate. The image data lost due to the saturation of the amount of incident light is interpolated by image data acquired from a range other than the range of the two long-time exposure lines 31. When distantly located image data is used for the interpolation, deterioration such as jaggy may easily occur in the HDR synthesized image.

However, the solid-state imaging device 5 according to the embodiment uses the period array in which one long-time exposure line 31 is disposed in proportion to two short-time exposure lines 32. The solid-state imaging device 5 can limit the range in which image data of the long-time exposure pixel is lost to each horizontal line, even when the amount of incident light is saturated. Therefore, the sense of high resolution can be maintained in the HDR synthesized image, compared to the comparative example in which image data is lost every two horizontal line.

The solid-state imaging device 5 can use the image data lost due to the saturation of the amount of incident light, when the image data acquired with the short-time exposure pixels close to a portion of the lost image data is interpolated. By using the closely located image data in the interpolation, the solid-state imaging device 5 can be configured such that deterioration such as jaggy rarely occurs in the HDR synthesized image. Thus, the solid-state imaging device 5 can acquire a high-quality HDR synthesized image.

In the solid-state imaging device 5, the units of the periodic array of the horizontal lines are not limited to the combination of one long-time exposure line 31 and two short-time exposure lines 32. In the solid-state imaging device 5, the units of the periodic array of the horizontal lines may be a combination of the long-time exposure lines 31 and the short-time exposure lines 32 of the number which is twice the number of long-time exposure lines 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel array in which a plurality of pixels are arrayed in horizontal and vertical directions;
a control unit that controls driving of the pixels for each horizontal line, in which the pixels are arrayed in the horizontal direction in the pixel array, applying one of a first exposure time and a second exposure time shorter than the first exposure time as an exposure time of the pixels; and
a high dynamic range synthesizing unit that synthesizes a first image signal from a first pixel which is the pixel to which the first exposure time is applied and a second image signal from a second pixel which is the pixel to which the second exposure time is applied,
wherein first horizontal lines which are the horizontal lines formed by the first pixels and second horizontal lines which are the horizontal lines formed by the second pixels form a periodic array in units of a combination of the first horizontal lines and the second horizontal lines of the number which is twice the number of first horizontal lines in the vertical direction of the pixel array.

2. The solid-state imaging device according to claim 1, wherein the high dynamic range synthesizing unit performs an interpolating process on a first target pixel, which is the first pixel to be subjected to high dynamic range synthesis, using the second image signals from the second pixels in a pixel block in which the first target pixel is centered.

3. The solid-state imaging device according to claim 2, wherein the high dynamic range synthesizing unit includes an interpolation processing circuit that performs the interpolating process according to array of the first horizontal lines and the second horizontal lines in the pixel block.

4. The solid-state imaging device according to claim 2, wherein the high dynamic range synthesizing unit performs the interpolating process according to array of the first horizontal lines and the second horizontal lines in the pixel block and array of color pixels in the pixel block.

5. The solid-state imaging device according to claim 2, wherein the high dynamic range synthesizing unit includes an adding circuit that adds a signal component which is the first image signal from the first target pixel and a signal component which is the result of the interpolating process.

6. The solid-state imaging device according to claim 1, wherein the high dynamic range synthesizing unit performs an interpolating process on a second target pixel, which is the second pixel to be subjected to high dynamic range synthesis, using the first image signal from the first pixel in the pixel block in which the second target pixel is centered.

7. The solid-state imaging device according to claim 6, wherein the high dynamic range synthesizing unit includes an interpolation processing circuit that performs the interpolating process according to array of the first horizontal lines and the second horizontal lines in the pixel block.

8. The solid-state imaging device according to claim 6, wherein the high dynamic range synthesizing unit performs the interpolating process according to array of the first horizontal lines and the second horizontal lines in the pixel block and array of color pixels in the pixel block.

9. The solid-state imaging device according to claim 6, wherein the high dynamic range synthesizing unit includes an adding circuit that adds a signal component which is the second image signal from the second target pixel and a signal component which is the result of the interpolating process.

10. The solid-state imaging device according to claim 1, wherein the combination is formed by one first horizontal line and two second horizontal lines.

11. An image processing method comprising:
controlling driving of pixels for each horizontal line in which the pixels are arrayed in horizontal direction in a pixel array in which the plurality of pixels are arrayed in the horizontal direction and vertical direction, applying one of a first exposure time and a second exposure time shorter than the first exposure time as an exposure time of the pixels;
performing high dynamic range synthesis of synthesizing a first image signal from a first pixel, which is the pixel to which the first exposure time is applied, and a second image signal from a second pixel which is the pixel to which the second exposure time is applied,
wherein first horizontal lines which are the horizontal lines formed by the first pixel and second horizontal lines which are the horizontal lines formed by the second pixels form a periodic array in the vertical direction of the pixel array, and
wherein the periodic array is formed in units of a combination of the first horizontal lines and the second horizontal lines of the number which is twice the number of first horizontal lines.

12. The image processing method according to claim 11, wherein an interpolating process is performed on a first target pixel, which is the first pixel to be subjected to the high dynamic range synthesis, using the second image signals from the second pixels in a pixel block in which the first target pixel is centered.

13. The image processing method according to claim 12, wherein the interpolating process is performed according to array of the first horizontal lines and the second horizontal lines in the pixel block.

14. The image processing method according to claim 12, wherein the interpolating process is performed according to array of the first horizontal lines and the second horizontal lines in the pixel block and array of color pixels in the pixel block.

15. The image processing method according to claim 12, wherein the high dynamic range synthesis includes adding a signal component which is the first image signal from the first target pixel and a signal component which is the result of the interpolating process.

16. The image processing method according to claim 11, wherein an interpolating process is performed on a second target pixel, which is the second pixel to be subjected to the high dynamic range synthesis, using the first image signal from the first pixel in a pixel block in which the second target pixel is centered.

17. The image processing method according to claim 16, wherein the interpolating process is performed according to array of the first horizontal lines and the second horizontal lines in the pixel block.

18. The image processing method according to claim 16, wherein the interpolating process is performed according to array of the first horizontal lines and the second horizontal lines and array of color pixels in the pixel block.

19. The image processing method according to claim 16, wherein the high dynamic range synthesis includes adding a signal component which is the second image signal from the second target pixel and a signal component which is the result of the interpolating process.

20. A camera module comprising:
- an imaging optical system that receives light from a subject and forms a subject image; and
- a solid-state imaging device that converts the light received by the imaging optical system into a signal charge to capture the subject image,
- wherein the solid-state imaging device includes
  - a pixel array in which a plurality of pixels are arrayed in horizontal and vertical directions,
  - a control unit that controls driving of the pixels for each horizontal line, in which the pixels are arrayed in the horizontal direction in the pixel array, applying one of a first exposure time and a second exposure time shorter than the first exposure time as an exposure time of the pixels, and
  - a high dynamic range synthesizing unit that synthesizes a first image signal from a first pixel which is the pixel to which the first exposure time is applied and a second image signal from a second pixel which is the pixel to which the second exposure time is applied, and
- wherein first horizontal lines which are the horizontal lines formed by the first pixels and second horizontal lines which are the horizontal lines formed by the second pixels form a periodic array in units of a combination of the first horizontal lines and the second horizontal lines of the number which is twice the number of first horizontal lines in the vertical direction of the pixel array.

* * * * *